United States Patent
Corsico Piccolino

(10) Patent No.: US 9,316,510 B2
(45) Date of Patent: Apr. 19, 2016

(54) METHOD AND DEVICE FOR DETECTING THE POSITION OF A CONVEYOR

(75) Inventor: Alessandro Corsico Piccolino, Vigevano (IT)

(73) Assignee: COMELZ S.P.A., Vigevano (IT)

( * ) Notice: Subject to any disclaimer, the term of this patent is extended or adjusted under 35 U.S.C. 154(b) by 210 days.

(21) Appl. No.: 14/009,925

(22) PCT Filed: Nov. 22, 2011

(86) PCT No.: PCT/EP2011/070703
§ 371 (c)(1),
(2), (4) Date: Oct. 4, 2013

(87) PCT Pub. No.: WO2012/136284
PCT Pub. Date: Oct. 11, 2012

(65) Prior Publication Data
US 2014/0022562 A1     Jan. 23, 2014

(30) Foreign Application Priority Data
Apr. 6, 2011  (IT) .............................. M12011A0562

(51) Int. Cl.
*G01D 5/34* (2006.01)
*G01D 5/347* (2006.01)
*B65G 43/00* (2006.01)

(52) U.S. Cl.
CPC .............. *G01D 5/347* (2013.01); *B65G 43/00* (2013.01); *G01D 5/34776* (2013.01); *B65G 2203/0283* (2013.01); *B65G 2203/0291* (2013.01)

(58) Field of Classification Search
CPC ................................ G01D 5/347; G01B 11/02
USPC ...................................................... 33/706, 707
See application file for complete search history.

(56) References Cited

U.S. PATENT DOCUMENTS

| | | | | |
|---|---|---|---|---|
| 4,953,459 A | * | 9/1990 | Ericsson | 101/115 |
| 5,585,603 A | * | 12/1996 | Vogeley, Jr. | 177/25.13 |
| 6,327,791 B1 | * | 12/2001 | Norcross et al. | 33/706 |
| 6,483,104 B1 | | 11/2002 | Benz et al. | |
| 6,510,617 B1 | * | 1/2003 | Gerdes et al. | 33/484 |
| 2003/0179271 A1 | * | 9/2003 | Russ | 347/104 |
| 2004/0003510 A1 | * | 1/2004 | Henshaw et al. | 33/707 |

(Continued)

FOREIGN PATENT DOCUMENTS

| | | |
|---|---|---|
| CN | 101049759 A | 10/2007 |
| CN | 101181824 A | 5/2008 |

(Continued)

OTHER PUBLICATIONS

International Search Report dated Jun. 3, 2012 issued in PCT/EP2011/070703.

(Continued)

*Primary Examiner* — Yaritza Guadalupe-McCall
(74) *Attorney, Agent, or Firm* — Scully, Scott, Murphy & Presser, P.C.

(57) ABSTRACT

A method for detecting the position of a conveyor, comprising the steps of: providing on the conveyor belt an irregular marking, constituted by marks and the like that are detectable optically; by means of a vision device, detecting portions of the marking at preset time intervals; comparing a detection performed by the vision device with a previously performed detection, in order to determine the extent and direction of the movement.

9 Claims, 1 Drawing Sheet

(56) References Cited

U.S. PATENT DOCUMENTS

2004/0221790 A1 11/2004 Sinclair et al.
2006/0283035 A1* 12/2006 Gordon-Ingram .............. 33/707
2014/0022562 A1* 1/2014 Corsico Piccolino ........ 356/616

FOREIGN PATENT DOCUMENTS

| | | |
|---|---|---|
| CN | 101852588 A | 10/2010 |
| DE | 102 45 323 A1 | 4/2004 |
| DE | 102005040772 A1 | 1/2007 |
| EP | 0 862 728 B1 | 1/2003 |

OTHER PUBLICATIONS

Chinese Office Action dated Apr. 23, 2015 received from Application No. 201180070677.7, together with an English-language translation.

* cited by examiner

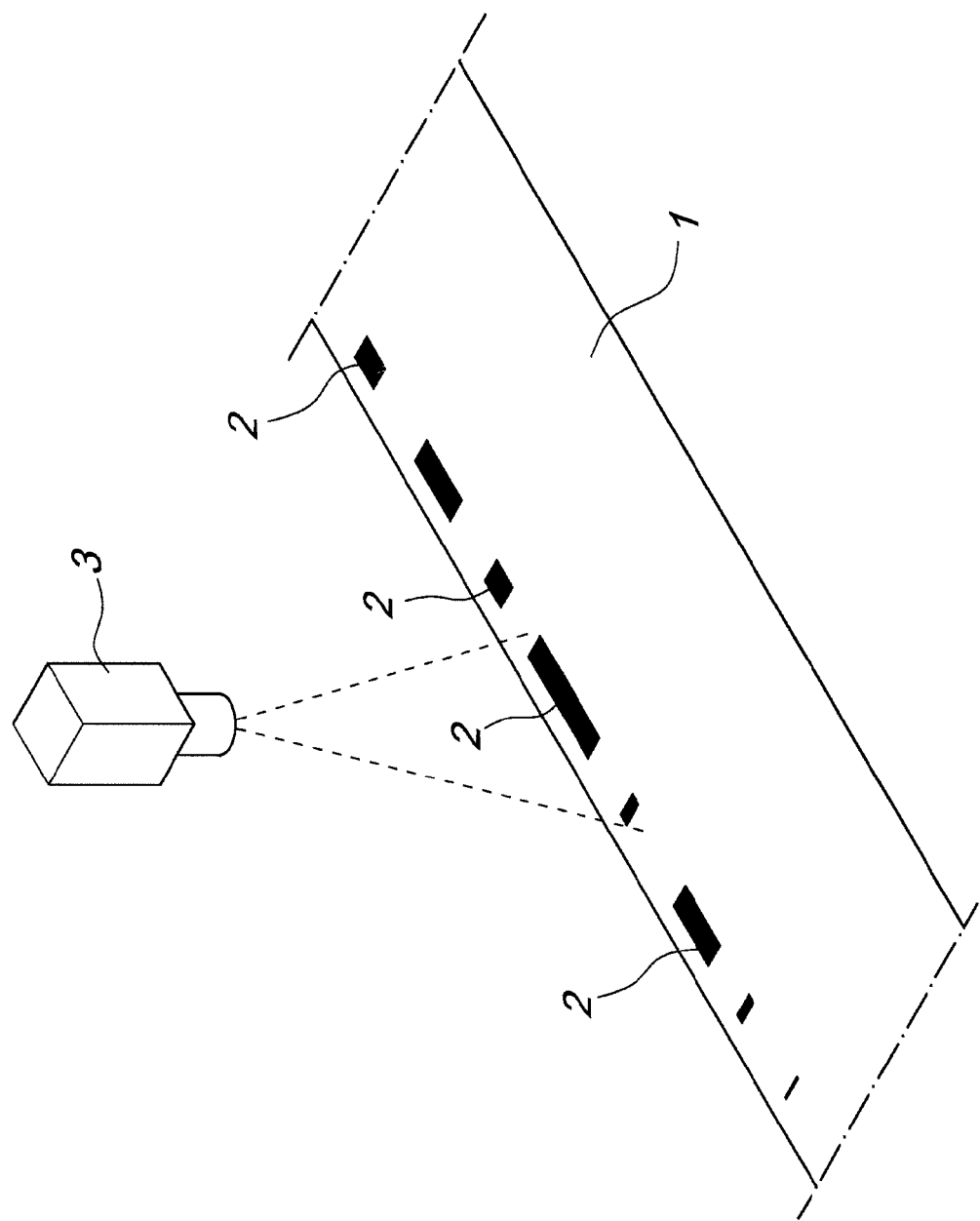

METHOD AND DEVICE FOR DETECTING THE POSITION OF A CONVEYOR

TECHNICAL FIELD

The present invention relates to a method and a device for detecting the position of a conveyor. More particularly, the invention relates to a method and a device for detecting the position of a conveyor that supports a material to be subjected to a process.

BACKGROUND ART

As is known, conveyors, such as for example belts and the like, which support material so as to move it along a working surface, are widespread.

Usually, the movement of the conveyor must be monitored carefully so as to be able to know exactly the position in which the conveyor is, in order to be able to perform the desired processes on the material being transported by the conveyor.

Generally, the movements of the conveyor are not performed in a precisely controlled manner by the movement elements due to construction reasons, due to distortions caused by the elasticity of the conveyor or by the progressive wear thereof, or also due to the fact that the movement of the conveyor is performed manually on the worktable in free directions.

A known solution that allows the precise detection of the position of the conveyor is to provide on the conveyor, such as for example a belt, a regular grid, and preset an optical detection system that makes it possible to detect the offsets of the elements of the grid after each movement, with respect to the expected position, which is indicated by the movement means. In other words, the movement means move in theory the belt by a given position, and the detection systems, by detecting the grid defined on the belt, can determine whether the movement indicated by the movement means has occurred precisely, or whether the movement is instead different from the desired one set by the movement means.

The method cited above, however, is expensive, since it requires great precision in the geometry of the grid defined on the belt, and it is difficult to provide and has poor repeatability in conditions of exposed wear to which the belt is subjected, indeed because the grid tends to undergo deformations that can give rise to false readings.

DISCLOSURE OF THE INVENTION

The aim of the present invention is to provide a method and a device for detecting the position of a conveyor that makes it possible to keep under control precisely, in each instant, the position of the conveyor.

Within this aim, an object of the present invention is to provide a method and a device for detecting the position of a conveyor that can be applied both in the case of a free movement and in the case of a controlled movement of the conveyor.

Another object of the present invention is to provide a method and a device for detecting the position of a conveyor that makes it possible to monitor substantially continuously the position of the conveyor.

Another object of the present invention is to provide a method and a device for detecting the position of a conveyor that are highly reliable, relatively simple to provide and at competitive costs.

This aim and these and other objects that will become better apparent hereinafter are achieved by a method for detecting the position of a conveyor, characterized in that it comprises the steps of:

providing on said conveyor belt an irregular marking, constituted by marks and the like that are optically detectable;

by means of a vision device, detecting portions of said marking at preset time intervals;

comparing a detection performed by said vision device with a previously performed detection, in order to determine the extent and direction of said movement.

BRIEF DESCRIPTION OF THE DRAWINGS

Further characteristics and advantages of the invention will become better apparent from the description of preferred but not exclusive embodiments of the method and of the device according to the present invention, illustrated by way of non-limiting example in the accompanying drawings, wherein the only FIGURE is a schematic perspective view of the device according to the invention for implementing the method according to the invention.

WAYS OF CARRYING OUT THE INVENTION

With reference to the FIGURE, the conveyor is designated by the reference numeral 1 and is constituted for example by a belt which is adapted to convey a material to be processed. The belt 1 is conveniently provided with a plurality of recognition markings defined by marks on the belt. The recognition marks, designated by the reference numeral 2, are arranged sequentially along the belt, at a region of the belt that is not usually occupied by the material to be processed.

A vision system, generally designated by the reference numeral 3, is arranged above the belt 1, so as to detect the marking defined on the belt proper.

Conveniently, the marking can be irregular, i.e., the distance between the marks 2 may not always be the same, and the marks can be all different one another or can repeat without however having a regular rate of repetition.

According to a first embodiment of the method according to the invention, in order to monitor the movements of the belt 1 correctly, the extent of each movement upon each detection by the vision system 3 must be such as to contain in the viewing field at least one recognizable portion of the marking of the belt, which had already been detected in the preceding position of the belt, at which the previous detection had been performed.

If the movement of the belt 1 is under the control of movement elements, at each optical detection by the vision system 3 there is already an expected position where the detected recognizable portion (marking) should be located before and after the movement of the belt.

In this case, the marking can have repeated portions, as long as there is, between the repeated portions, a distance that is greater than the maximum detection error by the vision system with respect to the movement system, so that on the basis of the position expected after the movement there can be no doubt in the identification of the several repeated marking portions.

If instead the movement of the belt 1 is free or actuated in an insufficiently precise way, the marking cannot have repeated portions, unless they are at distances that are greater than the extent of the viewing field of the vision system 3.

This occurs because the vision system 3 must be able to detect one marking and the next one and may, upon the next detection, again detect such marking and may consider it to be the same one detected in the previous detection.

With the type of marking described above, without any information as to the extent (and direction) of the movement, as long as the movement is within the limits described above, and the marking of the belt complies with what has been specified above, the vision system indicates with sufficient precision the exact position of the belt 1.

It is also possible to consider performing optical detections at a high rate, so as to obtain a sort of video and a continuous movement of the belt, resembling in this way a sort of tracking of the movement of the belt 1.

In a second embodiment of the method according to the invention, the marking constituted by the marks 2 on the belt 1 can be already known beforehand, either because it is printed in a known and precise manner or because it has been photographed entirely, or by measuring reference points, or detected conveniently by the same vision system according to the invention in a preliminary step of the use of the belt, by way of the method according to the first embodiment of the invention, i.e., by composing several successive images detected in the conditions specified above.

In this case, each individual detection performed by the vision system 3 enables to then perform a comparison with the complete mapping of the marking of the belt 1, so as to recognize directly the position of the belt by means of such comparison.

In this case, however, each marking portion of the belt, readable by the viewing field of the vision system 3, must be different from any other possible one.

In this case, the detections performed by the vision system must coincide temporally with the detections performed during the "learning" step, in which the belt is "mapped" in its entirety.

In this second embodiment, the movement of the belt must be performed in a controlled manner, so that the detections performed by the vision system can correspond to those performed by the same vision system in the learning step.

In practice it has been found that the method and the device according to the invention fully achieve the intended aim and objects, since they make it possible to detect the position of a conveyor in which the marking of an element can be performed without the precision required in the case markings of the known type, and most of all without the marking being affected by wear and by the stresses to which the conveyor is subjected.

The method and the device thus conceived are susceptible of numerous modifications and variations, all of which are within the scope of the appended claims; all the details may further be replaced with other technically equivalent elements.

The disclosures in Italian Patent Application No. MI2011A000562 from which this application claims priority are incorporated herein by reference.

The invention claimed is:

1. A method for detecting the position of a conveyor, comprising the steps of:
   providing on said conveyor an irregular marking, constituted by marks and the like that are detectable optically;
   by means of a vision device, detecting portions of said marking at preset time intervals;
   comparing a detection performed by said vision device with a previously performed detection, in order to determine the extent and direction of said movement wherein said step of detecting portions of said marking is preceded by a step of detecting all of said marking in order to obtain a complete mapping of said marking.

2. The method according to claim 1, wherein said irregular marking comprises repeated marking portions on said conveyor.

3. The method according to claim 2, wherein said step of detection of said marking portions by the vision system is performed with a high frequency.

4. The method according to claim 1, wherein said irregular marking comprises portions repeated at a distance that is not shorter than the extension of the viewing field of said vision system.

5. The method according to claim 1, further comprising the step of comparing said detected marking portion with said complete mapping of the marking of the conveyor.

6. A system for detecting the position of a conveyor, comprising a conveyor and a vision system arranged above said conveyor, wherein said conveyor comprises an irregular marking on its upper surface.

7. The system according to claim 6, wherein said irregular marking comprises marking portions which are repeated along said conveyor.

8. The system according to claim 6, wherein said marking comprises portions which are repeated along said conveyor, arranged at a distance that is not shorter than the extension of the viewing field of said vision system.

9. The system according to claim 6, wherein said marking comprises mutually different marking portions arranged along said conveyor.

* * * * *